United States Patent [19]

Frederiksen

[11] Patent Number: 4,979,738

[45] Date of Patent: Dec. 25, 1990

[54] CONSTANT SPATIAL DATA MASS RAM VIDEO DISPLAY SYSTEM

[75] Inventor: Jeffrey E. Frederiksen, Arlington Heights, Ill.

[73] Assignee: Midway Manufacturing Corporation, Chicago, Ill.

[21] Appl. No.: 558,622

[22] Filed: Dec. 6, 1983

[51] Int. Cl.⁵ ............................................. A63F 9/00
[52] U.S. Cl. ..................................... 273/1 E; 340/701
[58] Field of Search ................. 340/701, 703; 273/1 E

[56] References Cited

U.S. PATENT DOCUMENTS

| | | | |
|---|---|---|---|
| 3,011,164 | 11/1961 | Gerhardt | 340/324 |
| 3,497,760 | 2/1970 | Kiesling | 315/18 |
| 3,996,585 | 12/1976 | Hogan et al. | 340/324 |
| 4,026,555 | 5/1977 | Kirschner et al. | 273/85 R |
| 4,053,740 | 10/1977 | Rosenthal | 364/705 |
| 4,107,665 | 8/1978 | Mayer et al. | 340/324 |
| 4,121,283 | 10/1978 | Walker | 364/200 |
| 4,139,838 | 2/1979 | Inose et al. | 340/703 |
| 4,153,896 | 5/1979 | White | 340/731 |
| 4,155,095 | 5/1979 | Kirschner | 358/82 |
| 4,165,072 | 8/1979 | Stubben | 273/85 |
| 4,169,272 | 9/1979 | Rains et al. | 358/180 |
| 4,177,462 | 12/1979 | Chung | 340/703 |
| 4,180,805 | 12/1979 | Burson | 340/709 |
| 4,189,728 | 2/1980 | Stubben | 340/725 |
| 4,189,743 | 2/1980 | Schure et al. | 358/93 |
| 4,189,744 | 2/1980 | Stern | 358/93 |
| 4,200,867 | 4/1980 | Hill | 340/703 |
| 4,213,189 | 7/1980 | Mueller et al. | 364/100 |
| 4,232,374 | 11/1980 | Chung et al. | 364/900 |
| 4,254,409 | 3/1981 | Busby | 340/731 |
| 4,267,573 | 5/1981 | Chaikin et al. | 364/515 |
| 4,283,724 | 8/1981 | Edwards | 340/731 |
| 4,301,503 | 11/1981 | Frederiksen | 364/200 |
| 4,384,284 | 5/1983 | Juso et al. | 340/706 |
| 4,441,104 | 4/1984 | Finney, II | 340/725 |

Primary Examiner—Leo P. Picard
Attorney, Agent, or Firm—Rockey and Rifkin

[57] ABSTRACT

There is provided a video display system operable in a plurality of color resolution and pixel resolution modes while maintaining constant spatial data resolution and having a video display with a plurality of picture elements responsive to picture signals derived from video data in storage blocks which are spatially correlated with respective picture element blocks of the video display, and wherein the density of data storage per area of display is constant and the input/output of video data can take place at a constant data rate.

28 Claims, 5 Drawing Sheets

| AØ MODE 2 | | BØ MODE 3 | CØ MODE 1 |
|---|---|---|---|
| AØ,Ø  AØ,8 | | | |
| A Ø | | B Ø | C Ø |
| AØ,4  AØ,12 | | | |

FIG. 6

RAM, MEMORY MAP

| MODE 2 | AØ,Ø AØ,4 AØ,8 AØ,12 | MODE 3 | BØ,Ø,Ø ····· BØ,12,3 | MODE 1 | CØ |
|---|---|---|---|---|---|
| 0 | 1 | AØ | 1 0 | BØ | 0 0 | CØ |
| | DØ | | EØ | | FØ |
| | GØ | | HØ | | JØ |

FIG. 7A  190

| AØ,Ø,Ø | AØ,Ø,2 | AØ,4,Ø | AØ,4,2 |
|---|---|---|---|
| AØ,Ø,1 | AØ,Ø,3 | AØ,4,1 | AØ,4,3 |
| AØ,8,Ø | AØ,8,2 | AØ,12,Ø | AØ,12,2 |
| AØ,8,1 | AØ,8,3 | AØ,12,1 | AØ,12,3 |

ORIGINAL

FIG. B  190

| AØ,8,1 | AØ,8,Ø | AØ,Ø,1 | AØ,Ø,Ø |
|---|---|---|---|
| AØ,8,3 | AØ,8,2 | AØ,Ø,3 | AØ,Ø,2 |
| AØ,12,1 | AØ,12,Ø | AØ,4,1 | AØ,4,Ø |
| AØ,12,3 | AØ,12,2 | AØ,4,3 | AØ,4,2 |

ROTATED 90°

FIG. 8

CONSTANT SPATIAL DATA MASS RAM VIDEO DISPLAY SYSTEM

This invention relates to a video display system and more specifically to a video game display system capable of operating in a plurality of related color and pixel resolution modes while maintaining constant spatial data resolution. The video system has a video display with a plurality of picture elements (pixels) responsive to picture signals derived from video data stored in predefined, fixed size memory storage locations or constant size storage blocks which have a constant spatial correlation with predefined pixel blocks. Consequently, the density of data storage per area of video display screen is constant in all resolution modes, and the input/output of video data can occur at a constant data rate.

A variety of arcade and home video games, as well as home and business computer systems, utilize a video display system to display symbols, figures, and characters in color, as well as black and white. For example, in a video game each player usually has a control which may be manipulated to cause the character, symbol, or figure on a video display to interact in accordance with the rules of the particular game and often under the direction of a microprocessor unit. Each frame of the picture on the video display is comprised of a plurality of pixels which are rapidly and sequentially displayed in a raster scan of the video display screen. Frequently, a random access memory (RAM) is employed to store digital data representative of each pixel to be displayed on the screen of the video display. The digital data stored in the RAM is read synchronously with raster beam scanning of the correlated pixels on the video display. The digital data is converted to signals suitable for processing by the video display in order to define the particular pixels being scanned by the raster beam. A programmed microcomputer may be used to modify and update video data stored in the RAM and hence modify the resultant signal on the video display responsive to signals transmitted from an input source, such as a game control mechanism or keyboard.

In previous methods and apparatus which employ RAM storage techniques for display of picture signals, variable length memory words were required to define variable pixel and color resolution for the output picture signal for a pixel. For example, the more potential choices allowed for characterization of pixel color value, the more memory storage that is required for each pixel. Consequently, there is not constant spatial correlation between a pixel or a pixel block and the location of the memory storage block characteristic of the pixel color value or pixel block color values. Thus, there is a lack of constant spatial data resolution when varying the pixel and color resolution, and this results in less than optimum input/output memory processing time, irregular input/output data flow rates, and generally inefficient use of memory storage.

Accordingly, a method and apparatus have been developed which enable the complete characterization of pixels in terms of video data signals stored in predefined fixed memory locations or storage blocks which have a constant spatial correlation with predefined respective pixel blocks in a plurality of resolution modes. The invention also provides a constant input/output data rate and a constant density of data storage per area of video display screen in all resolution modes. The invention is also compatible with any spatially related compression technique, such as binary truncation coding.

Furthermore, in various embodiments of the invention the storage block in a RAM can be divided, or the number of memory bits descriptive of a pixel block can be allocated, to enable a trade-off between one mode of higher pixel resolution on the video display screen and a second mode of more color choices, but lower pixel resolution. In the spatially related compression embodiments this trade-off can also be selected if desired.

This trade-off in color and pixel resolution, or the allocation of bits in the storage block, can be associated with specification of fewer color choices for each of a larger number of smaller size pixel blocks (i.e. each block having 1 or more pixels), with fewer bits allocated for each uniquely specified pixel block unit and thus fewer color choices for the specified unit. On the other hand, for a greater number of bits allocated for each of a plurality of larger pixel block units, there are a greater number of color choices for each of the larger pixel blocks with more pixels, but the spatial resolution on the video display screen is diminished since the pixel block size is increased.

In one embodiment of the invention, a video display system is comprised of video means for providing video data representative of the video display presentation or more particularly an input means for providing an output signal responsive to an input stimulus and means for providing video data signals responsive to the output signal. Further, the video display system includes mode means for selecting one of a plurality of color resolution and pixel resolution modes, memory means for storing and outputting the video data signals from a constant size storage block in a RAM which has a constant spatial association or correlation with a predefined respective pixel block comprised of at least one pixel, and picture means for providing picture signals responsive to the mode means and the memory means. The system is further comprised of means for providing a color value output responsive to the mode means and the video data signal output from the storage block, wherein the color value output is spatially associated with the predefined respective pixel block, and wherein the picture means for providing the picture signal is responsive to the color value output.

It is therefore an object of this invention to provide a video display system capable of operating in a plurality of color and pixel resolution modes, and having a video display which has a plurality of pixels and is responsive to picture signals. It is a further object to provide a video display system wherein said pixels are responsive to picture signals derived from video data signals stored in constant size memory locations or storage blocks which have a constant spatial association with predefined respective pixel blocks. It is also an object of the invention to provide such a video display system for use in a video game system.

Other objects and advantages of the present invention will become apparent upon reading the following detailed description while referring to the attached drawings in which.

Figure 1:
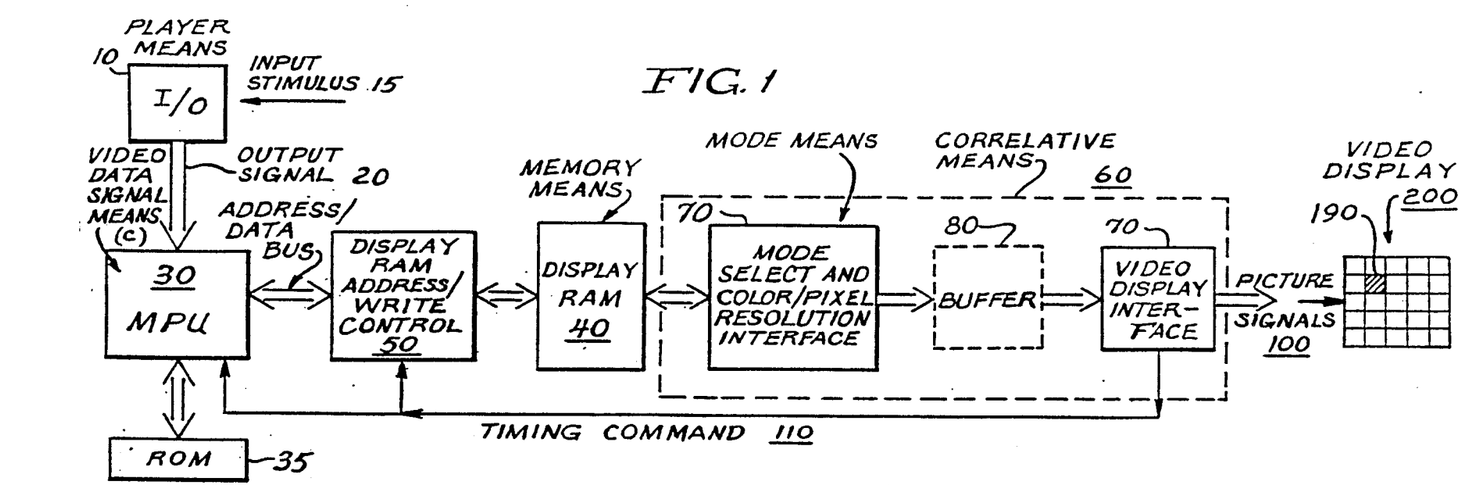
FIG. 1 is a block diagram of a video display system.

FIG. 1 illustrates, in block diagram form, one of the embodiments of a video display system. The video system comprises an input/output means 10, such as a player means in a game system, with the means 10 providing output signals 20 responsive to an input stimulus 15, comprising, for example, a keyboard, a light pen, or an audio stimulus and more particularly a player operated game handle as part of a joystick, or a player operated keyboard, pushbuttons, or slidable switches. A microprocessor unit 30 provides a video data signal responsive to the output signal 20, and said video data signal is stored in display RAM 40. The RAM 40 can be any type of static memory device such as Intel Corporation I2114, I2116, or I2147, or dynamic memory device, such as Intel Corporation I4116 or I4164, or any other read-write random access memory device. Such RAM devices are commercially available from a variety of sources and functionally permit stored data to be read from memory locations in the RAM 40 or allow new data to be written into and stored in such devices. A variety of such RAM devices are explained in the 1982 Component Data Catalog published by Intel Corporation. The data can be read from or written into the RAM 40, serially one bit at a time, or a plurality of bits in parallel fashion and at very high speed for any selected address.

Selective addressing of the stored data in the RAM 40 is accomplished by display RAM address/write control-device 50. The control device 50 is able to (a) address data in the RAM 40, (b) read video data from the RAM 40 in preparation for display on the video display screen 200, and (c) write updated data into the RAM 40 in preparation for the change of the existing display. Commands for updating the video data signals stored in the RAM 40 originate within the microprocessor 30 and are processed and implemented by control device 50. RAM address/write control device 50 can be comprised of any of a number of hardware systems such as those described in U.S. Pat. No. 4,026,555 which is hereby incorporated herein by reference. It is also possible to effect address/write control by an appropriate software routine stored in the read only memory ROM 35 manipulated by the microprocessor 30.

Figure 2:
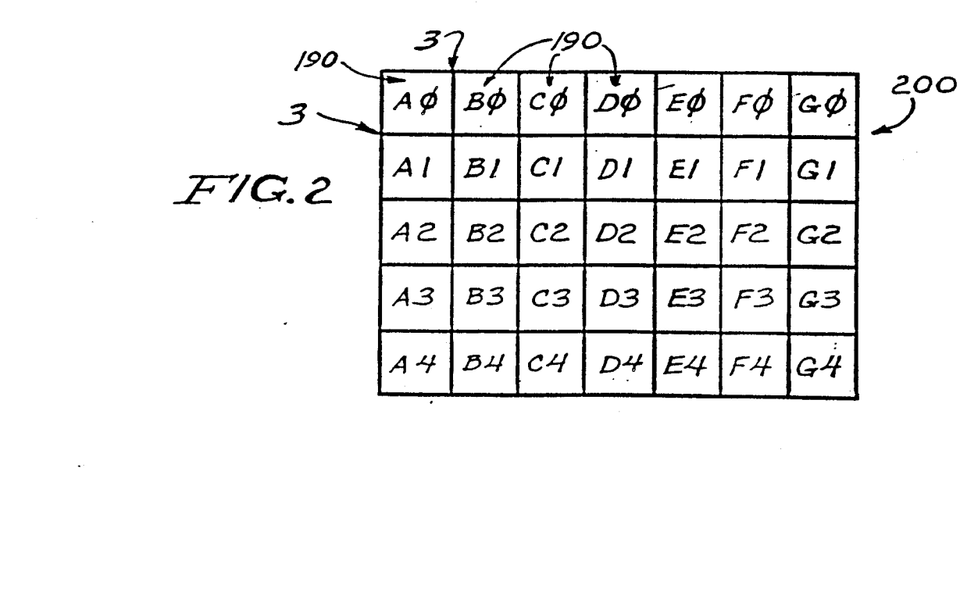
FIG. 2 illustrates pixel blocks on a video display screen.

FIG. 2 illustrates in more detail the video display screen 200. Encoded video data signals from the RAM 40 can be associated with a predefined respective pixel block 190 also shown in FIG. 2. The system therefore comprises a block means for providing the video display and includes a plurality of the pixel blocks 190 corresponding to the video display presentation, each of the pixel blocks comprising a group of vertically and horizontally adjacent pixels which make up the screen 200. In one embodiment, for a given number of individual pixels in a display, for example, 34,650, there will also be at least 34,650 corresponding storage bits in the RAM 40. In a preferred embodiment, a minimum of two (2) bits of storage per pixel are used.

In the illustrated embodiment, after data in RAM 40 is addressed by the control device 50, the video data signals stored in the storage block in RAM 40 are output from the RAM 40 to a correlative means 60, which acts to correlate or associate the predefined respective pixel block 190 with its spatially associated storage block in the RAM 40. The storage block in the RAM 40 comprises a number of bits, n, which characterizes the color and pixel resolution of the pixel block 190, and the storage block memory location has a constant spatial association with the pixel block 190. Herein, constant spatial association is taken to mean that the addressable storage block in the RAM 40 has a fixed associative, or correlated, address position and a constant storage size, or a constant bit length, for a given data set corresponding to the color and pixel resolution of the predefined, respective pixel block 190. Further, the n-bit storage block in the RAM 40 preferably also comprises several bits of mode data stored at associated memory locations. This mode data characterizes the selected color and pixel resolution mode for the predefined respective pixel block 190.

Figure 3A:
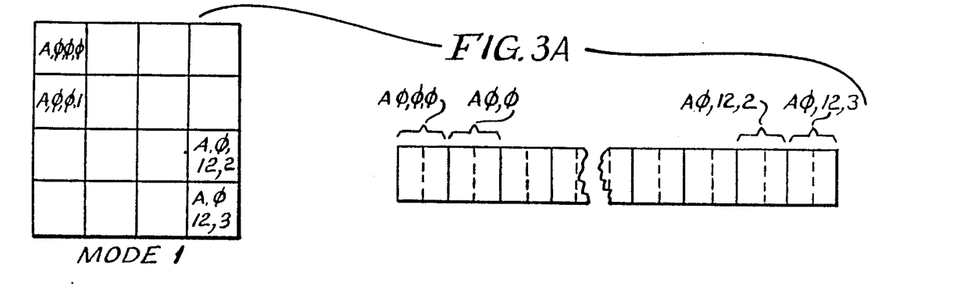
FIG. 3A, B, C, D and E illustrates a pixel block divided into pixel subelement blocks according to the mode selected, and also shows the appearance of spatially associated predefined storage blocks.
Figure 3B:
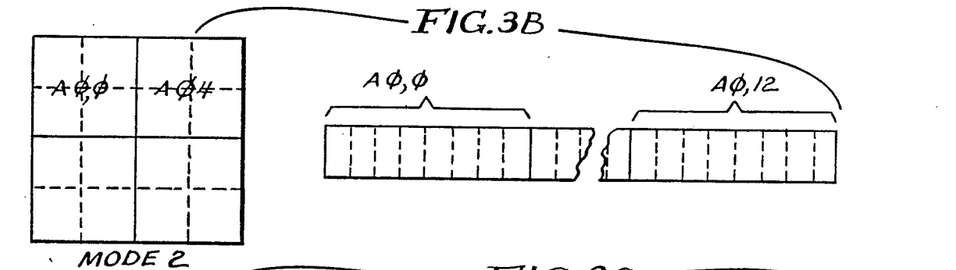
Figure 3C:
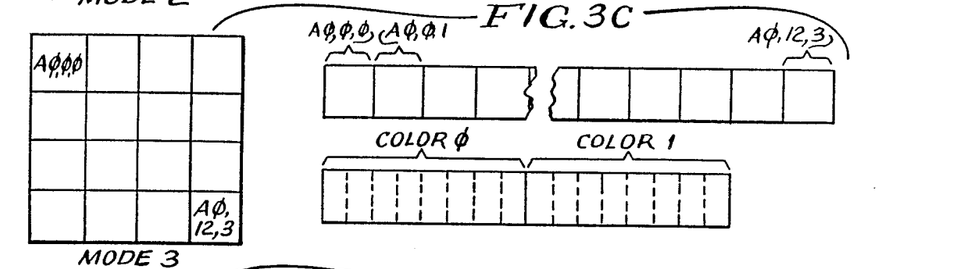

In a preferred set of embodiments, the color and pixel resolution of each storage block in the RAM 40 is characterized by 32 bits, plus an additional two mode bits if desired. For example, in the 4×4 pixel block 190 it is desirable to have rotational and transpositional (e.g. shift) symmetry for compatibility with video data spatial compression methods, such as block truncation coding. For the 4×4 pixel block, 190, with 32 bits characterizing the block 190, there are available at least the five modes which are illustrated in FIG. 3A-E (mode bits are not shown). Three preferable modes include: (1) as shown in FIG. 3A, 16 pixels for each of the blocks 190 with 2 bits/pixel coding providing four possible color choices per pixel for direct color coding, (2) as shown in FIG. 3B, 4 pixel subelement blocks per 16 pixel block, each comprising a subelement block of 2×2 pixels with 8 bits/pixel subelement block and a choice of $2^8$ or 1 of 256 colors per pixel subelement block, and (3) as shown in FIG. 3C, 16 pixels per block, with color compression coding and 1 bit per pixel specifying one of two color choices for each pixel in a pixel block, the two colors being characterized by the remaining 16 bits of the storage block. These 16 bits point to two addresses in a color map, and thus the colors are defined by the color map data in a RAM, for example. In the general case each pixel is characterized by r bits specifying one of $2^r$ color choices per pixel, with the $2^r$ choices described by the remaining bits in the storage block associated with the particular pixel block containing the pixel. In a preferred form of the color compression coding approach, an additional set of m color map bits are added to and in association with the 32 bits to enable selection of the colors from among $2^m$ color maps. For example, for m=4 bits one can select from among sixteen color maps. Each color map is preferably a RAM containing 256 colors of 24 bits length. These additional four color map bits are written from a register, not from the data bus which only writes to the thirty-two bits. The four color map bits are written from the register, and after the four color map bits are set, anything written refers to a specific one of the sixteen color maps. Therefore, this four bits of information is output to an output port such that anything written thereafter (until the four bits are changed) refers to a particular one of the sixteen maps. The additional four color map bits allows a much greater flexibility in color selection and provides more realistic color images with only a small increase in memory storage requirements.

Other modes shown in FIG. 3 include but are not limited to: (4) as shown in FIG. 3D, a half pixel mode with a block of 32 half pixels, wherein the pixel height is twice the pixel width, and each half pixel is characterized by 1 bit or a choice of 2 colors per half pixel. For purposes of this specification the subdivided fractional pixels can be considered as pixels which comprise all non-square pixels with at least 1 bit per pixel; and (5) as shown in FIG. 3E, the 4×4 block 190 with 32 bits per block 190 providing a choice of $2^{32}$ colors for the entire block of 16 pixels.

In another form of the invention, the pixel block 190 is comprised of a 4×4 pixel block with 16 pixels. The resolution is characterized by n=16×N bits, where N is a positive integer, plus 2 bits for mode data, or an 18 bit minimum storage block in the RAM 40. Preferably the two most significant bits or the two least significant bits denote the resolution mode. Alternatively, the mode selection can be determined by means of separate hardware.

Figure 4A:
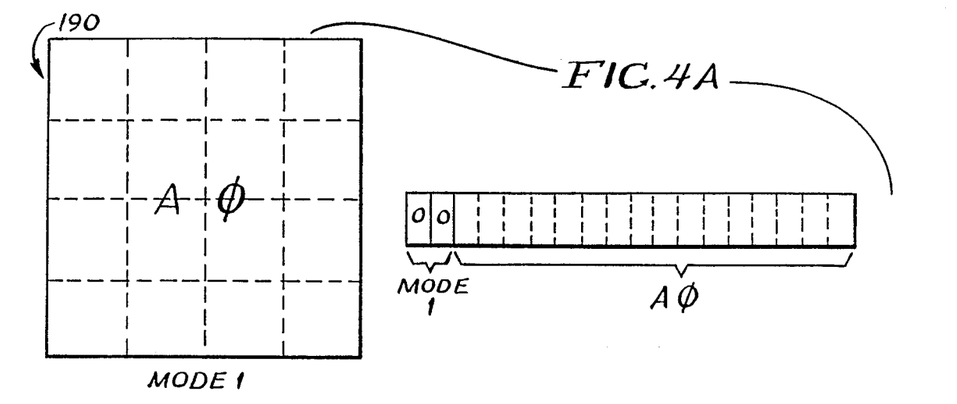
FIG. 4A, B and C shows a pixel block divided into three pixel subelement blocks in three different resolution modes of color and pixel detail, and shows the appearance of spatially associated predefined 16 bit storage blocks and associated mode indicating bits.
Figure 4B:
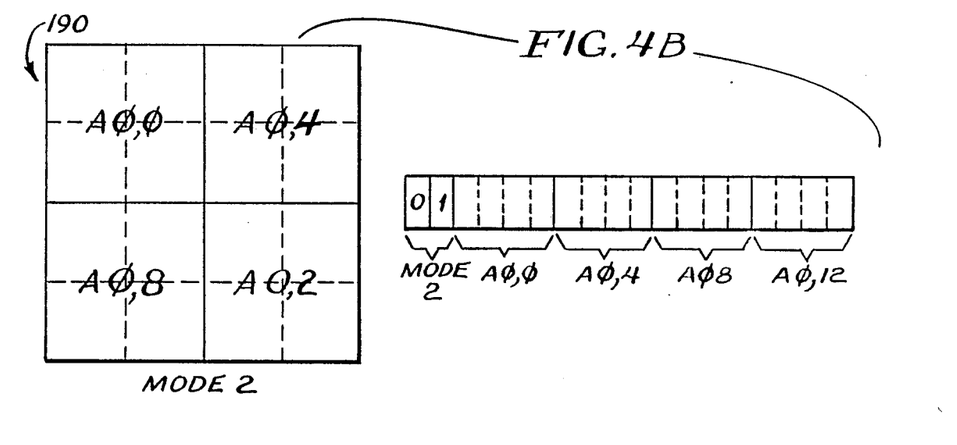
Figure 4C:
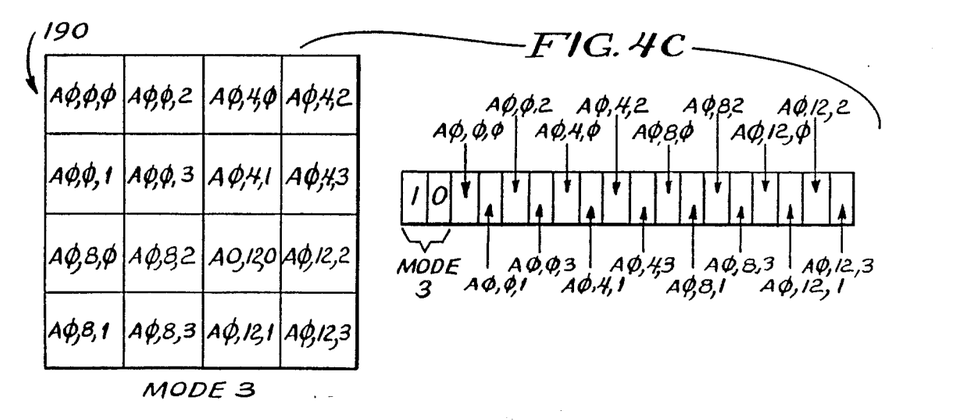

As shown in FIG. 4, various resolution modes are possible for the pixel block 190 illustrated containing 16 pixels, wherein the storage block in the RAM 40 includes n=16×1=16 bits without mode data. In Mode 1, as shown in FIG. 4A, all 16 pixels of the pixel block 190 positioned at AΦ have the same color with the associated 16 bits of memory in the storage block used to enumerate one of $2^{16}$, or 65,536 color choices. In Mode 2, as shown in FIG. 4B, the 4×4 pixel block 190 is divided into s=four pixel subelement blocks of 2×2 pixels (AΦ,Φ; AΦ,4; AΦ,8; and AΦ,12 wherein the number after the first comma represents one of the four subelement blocks). The associated 16 bit memory storage block in the RAM 40 is divided into (n/s) bits per subelement block. For example, (n/s)=4 bits or one nibble (4 bit word) per subelement block, and the subelement blocks are positioned as shown in FIG. 4B. For each color encoding which results in color mapping, each nibble describes one of a possible $2^{(n/s)}$, or $2^4=16$ color choices for each 2×2 pixel subelement block. In Mode 3 as shown in FIG. 4C, the 4×4 pixel block 190 is divided into 16 individual pixels (AΦ,Φ,Φ through AΦ,12,3 wherein the number between the first and second comma represents the subelement block as discussed above and the number after the second comma represents one of four pixels in each subelement block). Each pixel is characterized in color and detail (pixel density) resolution value by a single corresponding bit. Therefore, in Mode 3 only two color choices are possible for each pixel since only one bit is associated with each pixel, but linear detail resolution on the video display screen 200 is at a maximum in this example because the smallest specified unit (a pixel) is characterized. In the illustrated embodiment it is also possible to denote a fourth mode, since two mode bits are used to select the choice of mode. By increasing or decreasing the number of bits associated with the selection of color-detail resolution modes, a greater or lesser number of detail and color resolution mode color choices are possible. A variety of symmetries for pixel subelement blocks can be selected including square (3×3, 5×5, etc.), rectangular (2×4, 1×8, etc.), hexagonal and other lower symmetries. Alternatively the two mode bits can be eliminated and another means, such as hardware, can be utilized to select the mode for each 16 bit word.

In one embodiment shown in FIG. 1, correlative means 60 comprises mode select/color-pixel detail-resolution interface 70 coupled to the input of buffer 80. The output of the buffer 80 is connected to video display interface 90. The interface 70 receives the digitally encoded storage block video data signal from the RAM 40, and interface 70 comprises a color map which is a set of encoded digital words descriptive of the selected color and is structured in a manner known to those of ordinary skill in the art. For example, see U.S. Pat. No. 4,213,189 incorporated by reference herein. Within the interface 70 is stored all color values for the system, and these can be static color values or can be changed responsive to an external control, such as the microprocessor 30. The color map in the interface 70 thus assigns a digital word which has been pointed to by the input video data signals to the interface 70 from the storage block in RAM 40. The color value output characteristic of the pixel block 190 can then be stored in the buffer 80 preparatory to output to the display interface 90 which generates pictures signals 100 for display on video display screen 200. The display interface 90 also generates appropriate timing commands 110 input to the control device 50 and to the microprocessor 30 to read new video data signals into the RAM 40 to commence generation of the next picture signal 100.

Figure 5:
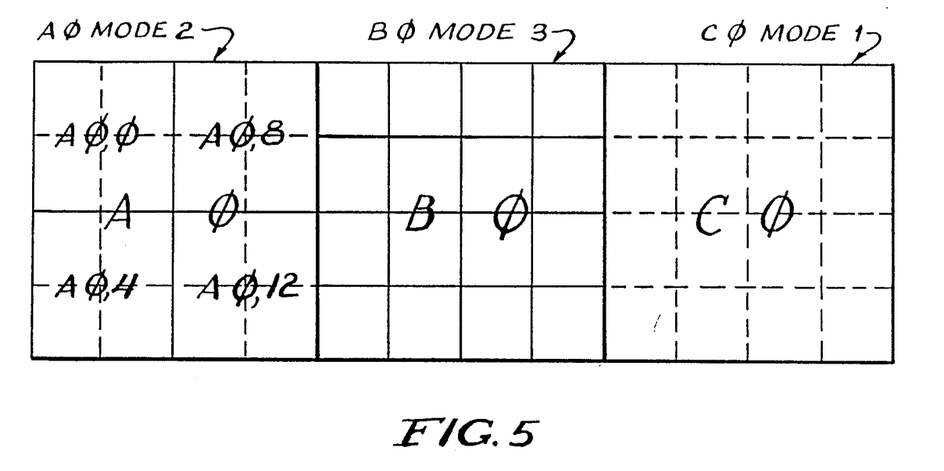
FIG. 5 illustrates a video display screen and three of the pixel blocks in three different resolution modes of color and pixel detail.

FIG. 5 illustrates an example of the display upon the video display screen 200, wherein the pixel blocks 190 are at locations AΦ, BΦ and CΦ, as shown in FIG. 2, and are selected for display in modes 2, 3, and 1, respectively, as defined in FIG. 4. The pixel blocks 190 have spatially associated memory locations or storage blocks in the RAM 40, shown left-to-right, in most-to-least-significant-bit storage-order.

Figure 6:
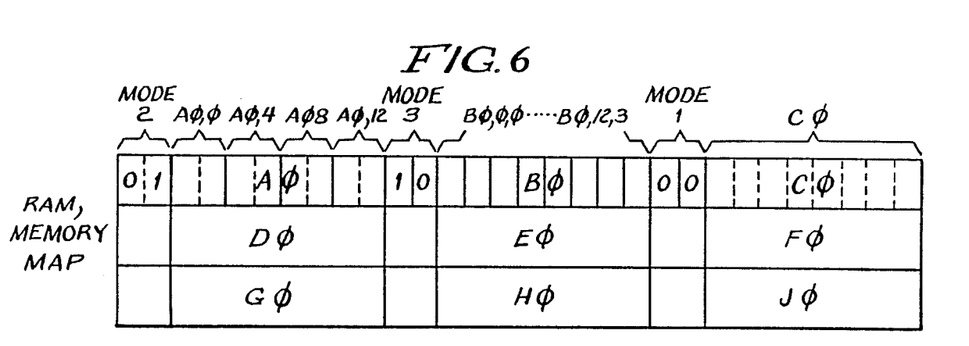
FIG. 6 illustrates a RAM memory map for the modes selected for pixel blocks in FIG. 5.

FIG. 6 illustrates one possible configuration for the associated RAM 40 memory map for the example of FIG. 5. Corresponding RAM storage block locations are labelled AΦ, BΦ, and CΦ, to indicate the association with the respective pixel block. However, whatever the configuration of the memory map, each storage block maintains a fixed or constant spatial association with respect to the predefined respective pixel block 190 in all color-detail resolution modes, providing for a constant size spatially associated data mass RAM video display system. Thus, the density of data storage per area of the video display screen 200 is constant. Furthermore, the rate of data input/output can be selected to be constant as a consequence of the constant storage size and spatial correlation. The constant data density enables constant timing input/output operations without affecting the ability to chance color and pixel resolution as desired, and further provides compatibility with spatially constant data compression techniques, such as block truncation coding.

The mode indicating bits are shown in FIG. 6 as the most significant bits of the color-detail resolution storage block. It is also possible to position the mode indicating bits on the least significant bit side of the color-detail resolution storage block, or in any other convenient location within the RAM 40, contiguous or not, so long as the mode bits are associated with the respective corresponding storage block. The mode indicating bits can also be in a separate memory associatively coupled to the appropriate color-detail resolution storage block, or be embodied in hardware or firmware mode control logic.

Figure 8:
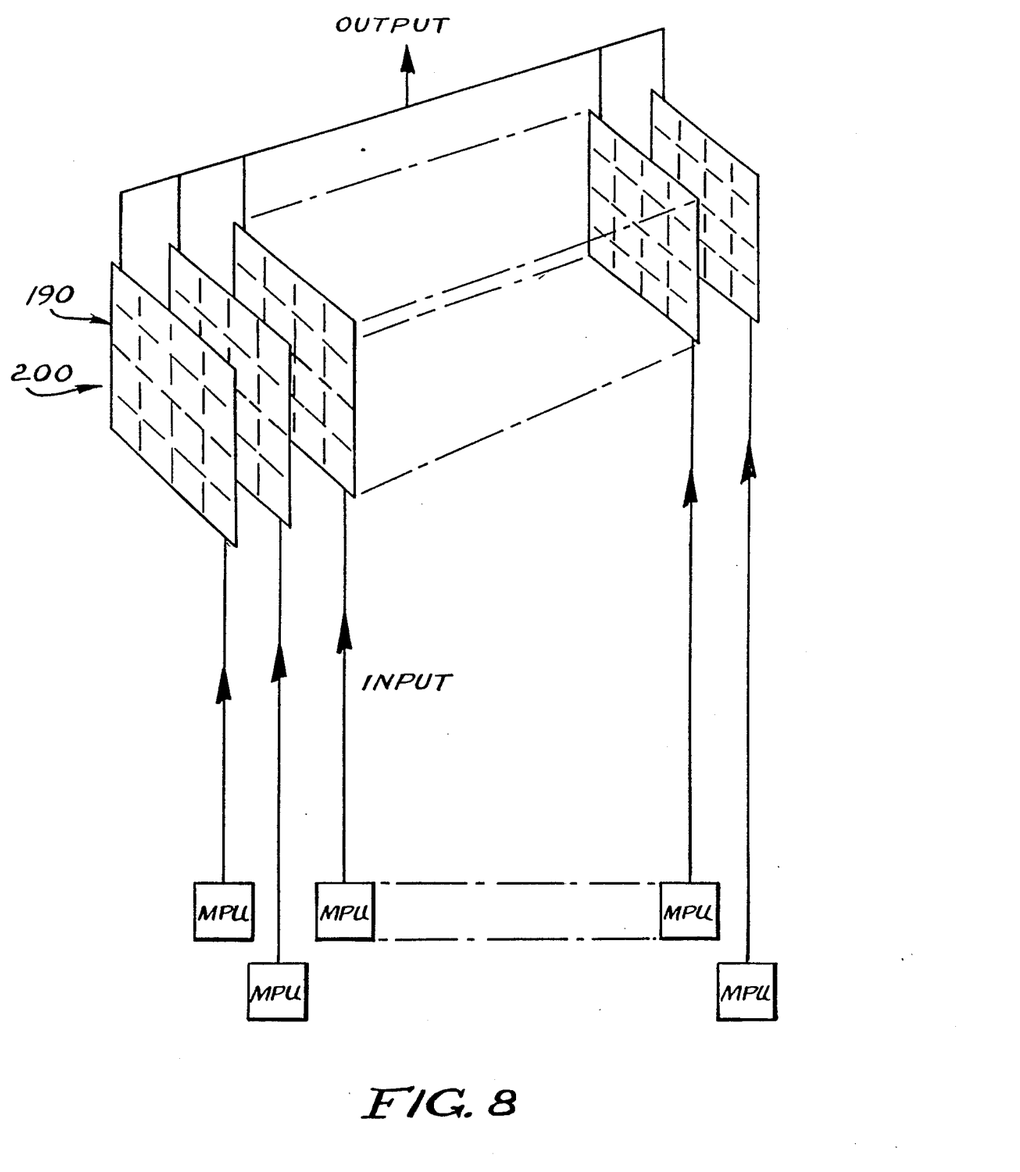
FIG. 8 illustrates the stacking of bit planes, each coupled to a microprocessor (MPU).

FIG. 8 illustrates an additional capability of the present invention, which provides for stacking and storing planes of pixel video data. A planar means associates or couples one microprocessor (MPU) or other appropriate electronic hardware with each plane of video data (i.e. bit plane). Composite means selectively process the data, such as by mixing and utilizing the stacked bit planes of data, to generate a single source composite, or a superimposed video display. Data in each bit plane can be input to and controlled by an associated respective piece of electronic hardware, such as a microprocessor or microcomputer, which processes and manipulates the video data in the bit planes. In one embodiment, according to predetermined conditions, only the highest priority bit plane of pixel data can be enabled and output in mixed format for display. Alternatively planes of pixel data can be fixed and selectively output in mixed format for display. For example, three bit planes can be used wherein each plane includes 1 of 3 colors and when combined with the other 2 bit planes produce a full color image.

The ability to have input and output of video data at a constant rate in the present invention also enables the lock-in of bit plane data. This permits synchronization of multiple bit planes for mixing or for interleaving, wherein the priority of planes can be assigned, analyzed, and sorted, or bit planes can be selectively combined, and the resulting data can be output for display. Priority values can, for example, be entered or stored in an 8 bit color map pointer for each plane, and the color map pointer for a plurality of planes can be in one of the planes, typically the end plane. Priority schemes can include various linkage techniques of coupling one plane to another—such as selectively enabling the output of one plane responsive to the enabling of the immediately previous plane.

Referring again to FIG. 1, the interface apparatus 70 also acts to process the digitally encoded signal received from the RAM 40 and provides a digital color value output which, in a preferred embodiment, can be read into the buffer 80. Alternatively, the appropriate timing control command signal 110 can be provided to the control apparatus 50, such that the color value output can be processed and displayed on the display 200 without a buffer, as explained in U.S. Pat. No. 4,026,555.

In the following illustrations of preferred embodiments, the following definitions apply. A scan line is understood to be one phosphor dot line in width. The scan line width is characterized by a horizontal retrace electron raster beam. A pixel line is at least one scan line in width. The display area is comprised of a plurality of pixel blocks, and having one or more block rows. A block row is at least one pixel line in width, and the illustrated preferred embodiment includes four (4) pixel lines per block row.

In the illustrated embodiment of FIG. 1, the color value output is stored in the buffer 80, which is for example, a double block row buffer, wherein at least one row of the pixel block 190 video data has been converted to the color value output and stored in a first buffer 80 and a subsequent row of the converted pixel block 190 video data is stored in a second buffer 80. Color value output is thus output for display from the first buffer 80 on one cycle, one line of pixel data at a time, while at the same time the color value output is being read into the second buffer 80 in preparation for output from the second buffer at the end of the output cycle for the first buffer 80.

In the buffer 80, stored data is ordered to provide correlative correspondence with the pixel lines which comprise the scan line output to the video display screen 200. In one preferred embodiment, each of the blocks 190 of 4×4 pixels is characterized by 16 bits for the color and pixel resolution values. Video data characteristic of each of the blocks 190 is converted and then transposed to an appropriate corresponding storage location in one of the buffers 80, such that all pixels in pixel lines 1-4 are in associated positions in one of the buffers 80 for all resolution modes. Therefore, in a preferred embodiment a block row of pixels has been characterized for display by reading only once, for each of the blocks 190 in the display 200, a correlated 16 bit storage block in the RAM 40.

Raster display of the color value output characteristic of each pixel line is accomplished by serial readout of the corresponding color value output from the appropriate buffer 80. Readout is timed such that the corresponding descriptive storage block has been output from the appropriate buffer 80 and processed by the video display interface 90 in preparation for display coincident with raster scan of the appropriate pixel screen location. Proper timed scanning of the RAM 40 can be accommodated by software stored in the ROM 35 and manipulated by microprocessor 30, or by hardware systems as described by U.S. Pat. No. 4,026,555, or by U.S. Pat. No. 4,200,807 which are hereby incorporated by reference herein.

The advantage of using at least two of the buffers 80 is that the RAM 40 memory access speed can be a synchronous to the pixel display rate, allowing faster computer access to the appropriate buffer 80. Further, additional hardware or appropriate software in the ROM 35 may enable alternating and/or interleaving storage and output of the color value output data between the two buffers. It is also possible that two complete frame buffers can be used to store two complete screen displays of the color value output so as to remove video display update timing sensitivity. One of the frame buffers can be updated while the other is being displayed. Further, by using a read-modify-write mode during the display cycle, auto erase or decay after a number of display cycles can be implemented which saves the update cycle the overhead of erasing the old image.

Other means can be used to accomplish output of the appropriate stored data coincident with raster scan of the associated predefined pixel. Vertical bit shifting to accomplish readout of the encoded storage block in the RAM 40 associated with a predefined pixel can also be accomplished by the microprocessor 30 using a software routine in the ROM 35 or by a separate piece of hardware within the interface 70.

In the illustrated embodiment, the color value output stored in the appropriate buffer 80, is processed by the video display interface 90 prior to display. Exemplary video display interface designs are disclosed in U.S. Pat. Nos. 4,155,095; 4,213,189; and 4,139,838 which are hereby incorporated by reference herein. The interface 90 interconnects the color value output from the interface 70 and provides the picture signals to the video display screen 200. Within the interface 90 picture signals are obtained by appropriate color mixing and the horizontal and vertical retrace synchronization signals are also provided to the display screen 200. In other embodiments the functions of the interface 90 can be subsumed by the interface 70 or other suitable means, such as a separate piece of hardware coupled to the RAM 40 and the display screen 200.

Repositioning of the pixels within the pixel block 190 or repositioning of the entire block on the display screen 200 can be carried out by shifting data in the display RAM 40 to effect rotation, translation, transposition or combinations thereof. In transposition, for example, each of the pixel blocks 190 (or, an entire picture frame) can be changed to a mirror image of its previous arrangement, such as a "flip" which forms a mirror image about a horizontal line or a "flop" which forms a mirror image about a vertical line, or combinations of "flips" and "flops." Repositioning in general is described in U.S. Pat. No. 4,301,502, which is hereby incorporated by reference herein.

Figure 7A:
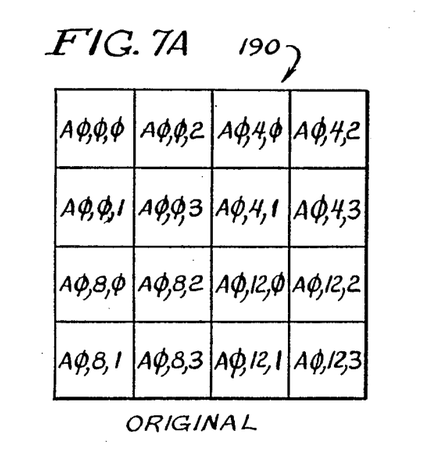
FIG. 7A and B illustrates original and final pixel locations within a pixel block before and after, respectively, a 90° rotation by memory bit shifting.

FIG. 7A and B illustrates the intra block rotation of a 25 single pixel block image 90° in a clockwise direction. The 4×4 pixel block 190 in FIG. 7A is rotated to a new position shown in FIG. 7B by shifting data bits within the display RAM 40. For example, video data corresponding to pixel $A\Phi,\Phi,\Phi$ is moved in memory storage one storage bit to the right in the same row, and data characteristic of $A\Phi,4,2$ is moved vertically to the next row but in the same column, either up or down one row depending on whether rotation is clockwise or counterclockwise. Each data bit site therefore has a characteristic bit shift associated therewith, responsive to the desired degree of rotation as determined by, for example, an input signal from a player joystick, a keyboard, or a software routine in the ROM 35 implemented by the microprocessor unit 30. In a similar fashion pixel blocks or portions of blocks, i.e. subelement blocks, can undergo repositioning by intra-block translation, rotation, or combinations thereof. For the selected repositioning movement, such as rotation, for example, the smallest rotational component desired can be accommodated by having sufficient color and pixel resolution for the pixel blocks 190 involved in the rotation. As aforementioned, these spatial movements can likewise occur across pixel block boundaries, such as inter-block rotation (rotation of a pixel block as a whole), translation, or transposition to a new block site, or combinations thereof.

Figure 3D:
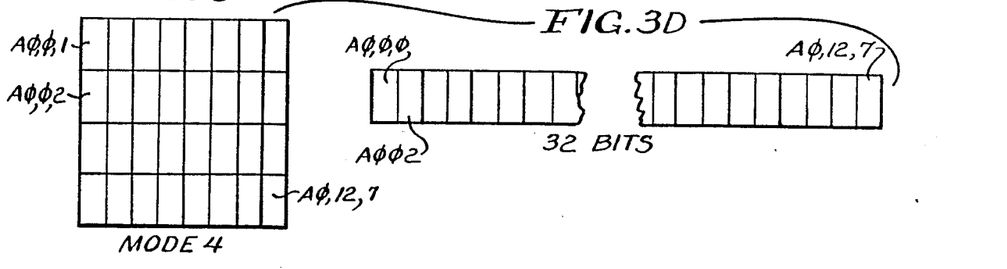
Figure 3E:
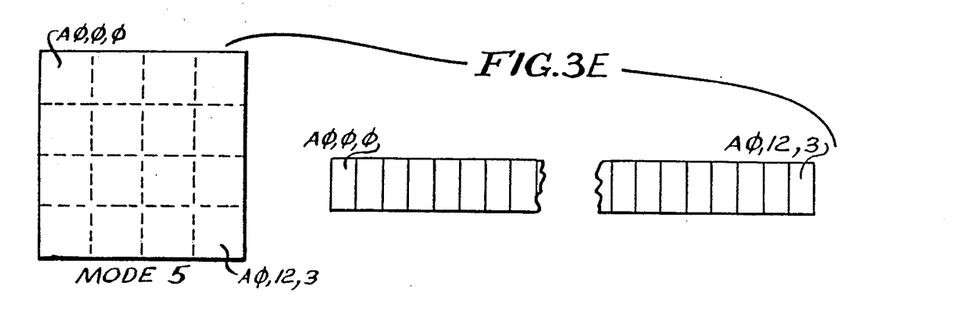

In the half pixel mode shown in FIG. 3D and discussed previously, the pixel block 190 comprises pixels whose height is twice the width. Repositioning of the pixel blocks 190 in the display 200 or repositioning of pixels within the pixel block 190 by bit shifting of the RAM memory can be used in this mode to effect translation, "flip," and "flop" and combinations thereof in the same manner as for pixels having square symmetry.

While there have been described herein various embodiments illustrative of the present invention, modification of the invention will be apparent only after study, and others being matters of routine electronic and logic design. As such the scope of the invention should not be limited by the particular embodiment and specific construction herein described, but should be defined by the appended claims, and equivalents thereof.

What is claimed is:

1. A video display system operating in a plurality of color and pixel resolution modes with constant data storage density per display area for all resolution modes, comprising:
 a display divided into a plurality of blocks, each block having a plurality of picture elements, the color of each of which is controlled to form a picture;
 memory means spatially correlated with the display for storing data in fixed size blocks, each block of data corresponding to a predefined block of picture elements on the display wherein the data defines the color of each picture element in the corresponding picture element block;
 means for identifying the color and pixel resolution mode for each data block stored in the memory means;
 correlating means responsive to said mode identifying means and the data stored in the memory means for each data block for providing color information for each picture element of said display, said color information being coupled to the display for controlling the picture formed thereon.

2. The video display system of claim 1 wherein the mode identifying means identifies a first mode for a first data block and a second mode for a second data block wherein the color and pixel resolution of the picture element block corresponding to the first data block is different than the resolution of the picture element block corresponding to the second data block.

3. The video display system of claim 1 wherein each data block includes n bits of color data and at least one of the plurality of resolution modes is such that the n bits of data for a data block define $2^r$ color choices for s picture elements in the corresponding picture element block where $r \times s = n$.

4. The video display system of claim 3 wherein each data block includes 32 bits of color data and one of said resolution modes is such that each block of data defines $2^2$ color choices for 16 picture elements.

5. The video display system of claim 3 wherein each data block includes 32 bits of color data and one of said resolution modes is such that each block of data defines $2^8$ color choices for 4 picture elements.

6. The video display system of claim 3 wherein each data block includes 16 bits of color data and one of said resolution modes is such that each block of data defines $2^4$ choices for 4 picture elements.

7. The video display system of claim 1 wherein each data block includes n bits and at least one of the plurality of resolution modes is such that the n bits of data for a data block define $2^n$ color choices for the corresponding picture element block with all of the picture elements of the block having the same color.

8. The video display system of claim 1 wherein said color information providing means includes an addressable color memory for storing color information, each data block includes n bits of color information for s picture elements in the corresponding picture element block and at least one of the plurality of resolution modes is such that two color choices are defined by 1 bit of data for each picture element in the block and the remaining n-s bits of data in the data block form two addresses to the respective location in the addressable color memory at which the color information for the two color choices is stored.

9. The video display system of claim 8 wherein said data block includes 32 bits of color information for 16 picture elements and each address to the addressable color memory has 8 bits.

10. The video display system of claim 1 wherein each data block includes n bits of color data and at least one of the plurality of resolution modes is such that each bit of data in the data block defines one of two color choices for n half picture elements wherein the height of each of the picture elements is twice the width of the element.

11. A video display system operating in a plurality of color and pixel resolution modes with constant data storage density per display area for all resolution modes, comprising:
- a display divided into a plurality of blocks, each block having a plurality of picture elements, the color of each of which is controlled to form a picture;
- a source of video data signals, the data signals representing a picture to be shown on the display;
- means for storing the video data signals in fixed size blocks, each block of video data signals corresponding to a particular block of picture elements on the display such that the storage means is spatially correlated with the display;
- means for identifying the color and pixel resolution mode of each data block stored in the storage means;
- a color memory means for storing color information, said color memory means outputting color information to said display means for each block of picture elements of said display in response to the mode and video data signals for each corresponding data block.

12. The video display system of claim 11 further including:
- a first buffer coupled to the color memory means for receiving color information therefrom during a first cycle and for outputting the color information to the display during a second cycle; and
- a second buffer coupled to the color memory means for receiving color information therefrom during the second cycle and for outputting the color information to the display during the first cycle.

13. The video display system of claim 11 further including means for shifting the video data signals stored in the storage means, said shifting means being operable for each of the plurality of resolution modes.

14. The video display system of claim 13 further including means for controlling the shifting means to shift the video data signals in a manner to effect intrablock rotation of the data signals.

15. The video display system of claim 13 further including means for controlling the shifting means to shift the video data signals in a manner to effect intrablock translation of the data signals.

16. The video display system of claim 13 further including means for controlling the shifting means to shift the video data signals in a manner to effect intrablock transportation of the data signals.

17. The video display system of claim 13 further including means for controlling the shifting means to shift the video data signals in a manner to effect interblock translation of the data signals.

18. The video display system of claim 13 further including means for controlling the shifting means to shift the video data signals in a manner to effect interblock transportation of the video data signals.

19. The video display system of claim 13 further including means for controlling the shifting means to shift the video data signals in a manner to effect interblock rotation of the video data signals.

20. The video display system of claim 11 wherein said source of video data signals includes a plurality of processors and said storage means includes a plurality of bit planes each associated with a particular processor for receiving video data signals therefrom.

21. A video display system operating in a plurality of color and picture element resolution modes with constant data storage density per display area for all resolution modes, comprising:
- a display divided into a plurality of blocks, each block having a plurality of picture elements the color of each of which is controlled to form a picture;
- memory means spatially correlated with the display for storing data in fixed size blocks, each block of data corresponding to a predefined block of picture elements on the display wherein the data in each data block includes color and picture element resolution mode information for that block and color information for each picture element in the corresponding picture element block; and
- means responsive to the mode and color information stored in the memory means for correlating the color information in a data block with a particular picture element of the corresponding picture element block on the display to control the color of each of the picture elements.

22. The video display system of claim 21 wherein the correlating means includes a plurality of color maps each storing values identifying particular colors and said data stored in the memory means includes color map information identifying a particular color map from which the colors of the picture elements is selected in accordance with the color information stored in the data block.

23. The video display means of claim 21 wherein the correlating means includes:
- a color map which stores values each identifying a particular color;
- means for selecting a color value from the color map for each picture element of each picture element block in accordance with the mode and color information stored in the corresponding memory means data block; and
- means responsive to the selected color values of each picture element for controlling the color thereof to form a picture on the display.

24. The video display means of claim 23 further including:
- a first buffer for storing selected color values from the color map during a first cycle and for outputting the color values to the control means during a second cycle; and
- a second buffer for storing selected color values from the color map during the second cycle and for outputting the color values to the control means during the first cycle.

25. The video display system of claim 21 wherein each data block includes n bits of color information and at least one of the plurality of resolution modes is such that the n bits of color information for a data block define $2^r$ color choices for s picture elements in the corresponding picture element block where $r \times s = n$.

26. The video display system of claim 21 wherein each data block includes n bits of color information and at least one of the plurality of resolution modes is such that the n bits of color information for a data block define $2^r$ color choices for the corresponding picture element block with all of the picture elements of the block having the same color.

27. The video display system of claim 21 wherein the correlating means includes an addressable color memory for storing color values, each data block includes n bits of color information for s picture elements in the corresponding picture element block and at least one of the plurality of resolution modes is such that two color choices are defined by one bit of color information for each picture element in the block and the remaining n-s bits of data in the block form two addresses to the locations in the addressable color memory at which the color values for the two color choices are respectively stored.

28. The video display system of claim 21 wherein each data block includes n bits of color information and at least one of the plurality of resolution modes is such that each bit of data in the data block defines one of two color choices for n half picture elements wherein the height of each of the picture elements is twice the width of the element.

* * * * *